(12) United States Patent
Osako et al.

(10) Patent No.: US 11,206,855 B2
(45) Date of Patent: Dec. 28, 2021

(54) HIGH TEMPERATURE FOOD HEATING DEVICE

(71) Applicant: Sodick Co., Ltd., Kanagawa (JP)

(72) Inventors: Kenichi Osako, Kanagawa (JP);
Akinori Noguchi, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 228 days.

(21) Appl. No.: 16/154,744

(22) Filed: Oct. 9, 2018

(65) Prior Publication Data
US 2019/0116850 A1  Apr. 25, 2019

(30) Foreign Application Priority Data

Oct. 24, 2017 (JP) .............................. JP2017-205134

(51) Int. Cl.
*A23L 7/109* (2016.01)
*A23L 3/015* (2006.01)
(Continued)

(52) U.S. Cl.
CPC ................ *A23L 7/109* (2016.08); *A23G 3/20* (2013.01); *A23G 3/28* (2013.01); *A23L 3/0155* (2013.01);
(Continued)

(58) Field of Classification Search
CPC ........ A23L 7/109; A23L 3/0155; A23L 3/027; A23L 3/045; A23L 3/065; A23L 3/085; A47J 2027/008

See application file for complete search history.

(56) References Cited

U.S. PATENT DOCUMENTS 1,419,139 A * 6/1922 Hunter .................... A23L 3/045
99/362
3,619,126 A  11/1971 Carvallo
(Continued)

FOREIGN PATENT DOCUMENTS

JP  S42021721  10/1967
JP  S49035434  9/1974
(Continued)

OTHER PUBLICATIONS

"Office Action of Japan Counterpart Application," with machine English translation thereof, dated Jun. 5, 2019, p. 1-p. 8.
(Continued)

*Primary Examiner* — John J Norton
(74) *Attorney, Agent, or Firm* — JCIPRNET

(57) ABSTRACT

A high temperature food heating device includes a high temperature heating tank composed of three tanks, which are a main tank, a front reserve tank and a reserve tank, each of the front and rear reserve tanks has a first storage part having an opening at the upper part and a second storage part communicating with the first storage part at the lower part of the first storage part and having an opening at the upper part. In the high temperature food heating device, a communication chamber for communicating between a water surface of each of the second storage parts of the front reserve tank and the rear reserve tank and a water surface of the main tank and storing a liquid or a gas inside is provided, and a high pressure gas or a pressurized liquid is supplied from a high pressure fluid supply section into the communication chamber.

5 Claims, 1 Drawing Sheet

(51) Int. Cl.
  *A23G 3/20*  (2006.01)
  *A23G 3/28*  (2006.01)
  *A23L 3/04*  (2006.01)
  *A47J 27/00*  (2006.01)

(52) U.S. Cl.
  CPC .......... *A23L 3/045* (2013.01); *A23C 2210/15* (2013.01); *A47J 2027/008* (2013.01)

(56) References Cited

U.S. PATENT DOCUMENTS

| | | | |
|---|---|---|---|
| 3,634,099 A * | 1/1972 | Wilson | A23L 3/003 |
| | | | 426/412 |
| 3,927,976 A * | 12/1975 | Reimers | A23L 3/045 |
| | | | 422/296 |
| 2009/0238937 A1 | 9/2009 | Yamazaki et al. | |

FOREIGN PATENT DOCUMENTS

| | | |
|---|---|---|
| JP | S60108015 | 6/1985 |
| JP | 60207558 A * | 10/1985 |
| JP | S60198114 | 10/1985 |
| JP | S60207558 | 10/1985 |
| JP | H09285282 | 11/1997 |
| JP | 2011050611 | 3/2011 |
| WO | 9929187 | 6/1999 |

OTHER PUBLICATIONS

"Office Action of Korea Counterpart Application," with English translation thereof, dated Nov. 15, 2019, p. 1-p. 7.

Office Action of Japan Counterpart Application, with English translation thereof, dated Feb. 26, 2020, pp. 1-10.

"Office Action of India Counterpart Application", dated Jun. 12, 2020, with English translation thereof, pp. 1-6.

* cited by examiner

HIGH TEMPERATURE FOOD HEATING DEVICE

CROSS-REFERENCE TO RELATED APPLICATION

This application claims the priority of Japan patent application serial no. 2017-205134, filed on Oct. 24, 2017. The entirety of the above-mentioned patent application is hereby incorporated by reference herein and made a part of this specification.

TECHNICAL FIELD

The disclosure relates to a high temperature food heating device which continuously heats foods such as noodles, retort foods, canned foods and bottled foods with water at a temperature higher than 100° C.

DESCRIPTION OF RELATED ART

The high temperature food heating device is, for example, a high temperature noodle boiling machine. The high temperature noodle boiling machine boils noodles in a noodle boiling tank which stores water above 100° C. The high temperature noodle boiling machine shortens the time to sterilize noodles, shortens the time to boil noodles, or improves the texture of boiled noodles. The water also includes hot water. If the noodles are directly supplied from the outside of the noodle boiling tank at room temperature into the noodle boiling tank at a high temperature, the time taken to boil the noodles becomes longer. If boiled noodles are directly taken out of the noodle boiling tank at a high pressure to the outside of the noodle boiling tank at a normal pressure, the noodles may rupture and sometimes lose its shape.

For example, the high temperature noodle boiling machine in Patent Document 1 (Japanese Patent No. S49-35434), Patent Document 2 (Japanese Laid-Open No. S60-207558), Patent Document 3 (Japanese Laid-Open No. S60-108015), and Patent Document 4 (Japanese Laid-Open No. S60-198114) has a main tank, a front reserve tank, and a rear reserve tank. The main tank is partitioned with a first partition plate and a second partition plate standing from the bottom surface inside the noodle boiling tank and stores water at a high temperature, the front reserve tank is adjacent to the main tank via the first partition plate, and the rear reserve tank is adjacent to the main tank via the second partition plate. Noodles are sequentially sent to the respective tanks and boiled through the path of the front reserve tank→the main tank→the rear reserve tank.

For example, the high temperature noodle boiling machine in Patent Documents 3 and 4 applies a pressure exceeding the atmospheric pressure to water at 100° C. in the main tank by a steam pressure of the main tank, a hydraulic head in the front reserve tank, and a hydraulic head in the rear reserve tank, and boils water in the main tank to a temperature over 100° C. The noodles are boiled in the water at a temperature over 100° C. in the main tank. In the front reserve tank, the noodles can be gradually pressurized and preheated. In the rear reserve tank, the noodles can be gradually depressurized and cooled off.

The inside of the front reserve tank is partitioned by providing a first vertical wall part facing the first partition plate. The inside of the rear reserve tank is partitioned by providing a second vertical wall part facing the second partition plate. Between the first vertical wall part and the second vertical wall part, a lid plate for covering the main tank from the top is provided. A first intermediate water surface is formed in the front reserve tank between the first partition plate and the first vertical wall part. The first intermediate water surface is below the water surface in the front reserve tank facing the outside of the noodle boiling tank. A second intermediate water surface is formed in the rear reserve tank between the second partition plate and the second vertical wall part. The second intermediate water surface is below the water surface in the rear reserve tank facing the outside of the noodle boiling tank.

A first steam layer extending above the first intermediate water surface in the front reserve tank and the main tank water surface is formed. A second steam layer extending above the second intermediate water surface in the rear reserve tank and the main tank water surface is formed.

SUMMARY

The heat insulating effect between the water in the main tank and the water in the front reserve tank and between the water in the main tank and the water in the rear reserve tank by the first and second steam layers is low. The temperature of the water in the front reserve tank and the rear reserve tank becomes higher than the desired temperature under the influence of the heat of the main tank. In the front reserve tank and the rear reserve tank, the temperature control of water becomes difficult. For example, the original functions such as preheating the noodles and cooling the noodles are impaired. Also, since the water is heated with steam discharged from a steam pipe, the temperature control of the respective tanks is difficult. Furthermore, since the first steam layer and the second steam layer are subjected to pressures by the hydraulic head in the front reserve tank and the hydraulic head in the rear reserve tank, the first and second steam layers tend to be thin, and the heat insulating effect is even lower. While the structure for forming the steam layers, that is, a first steam chamber and a second steam chamber composed of the vertical wall parts and the lid plate as described above, can be enlarged to further increase the areas and the thicknesses of the first and second steam layers, the size of the noodle boiling machine will be increased by doing so.

The disclosure provides a high temperature food heating device that can provide a sufficient heat insulating effect between the water in the main tank and the water in the front reserve tank and between the water in the main tank and the water in the rear reserve tank, more easily control the temperatures of the respective tanks, and avoid increasing the size of the high temperature food heating device. Additional objects and advantages of the disclosure will be set forth in the description that follows.

An embodiment of the disclosure provides a high temperature food heating device. The high temperature food heating device includes a heating tank, a heating section, a container conveying section, a communication chamber, and a high pressure fluid supply section. The heating tank includes three tanks, which are a main tank for storing water at a temperature higher than 100° C. and a front reserve tank and a rear reserve tank respectively storing water. Each of the front reserve tank and the rear reserve tank has a first storage part having an opening at an upper part and a second storage part communicating with the first storage part at a lower part of the first storage part and having an opening at an upper part. The heating section heats the water in the main tank. The container conveying section conveys a container accommodating foods as an object to be heated to pass through, in order, the respective water of the front reserve tank, the main tank and the rear reserve tank. The communication chamber communicates between a water surface of each of the second storage parts of the front reserve tank and the rear reserve tank and a water surface of the main tank and storing a gas or a liquid inside the communication chamber. The high pressure fluid supply section supplies a high pressure gas or a pressurized liquid into the communication chamber.

The high temperature food heating device of the disclosure can prevent the temperatures of the water in the front reserve tank and the rear reserve tank from rising to an unfavorable extent due to the heat from the main tank, and can make the temperature of the main tank higher. The high temperature food heating device of the disclosure can make it easy to control the temperatures of the water in the main tank, the front reserve tank and the rear reserve tank. The high temperature food heating device of the disclosure can also prevent the device size from increasing.

DESCRIPTION OF THE EMBODIMENTS

Figure 1:
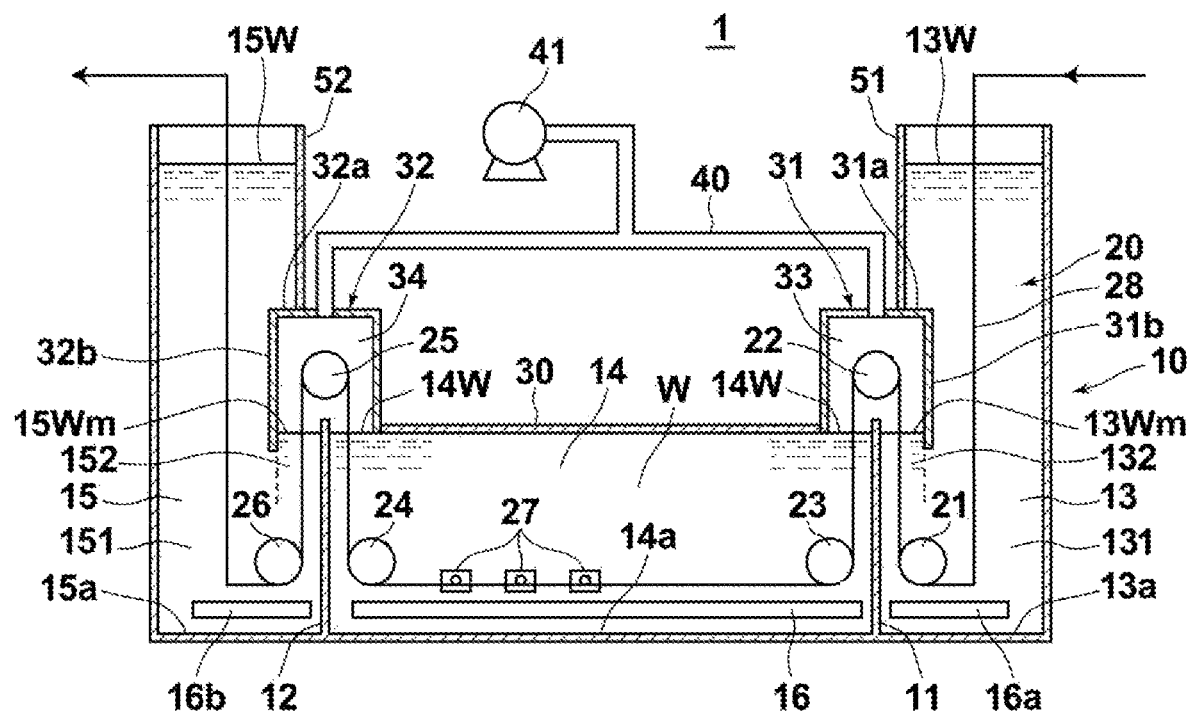
FIG. 1 is a schematic side view illustrating a high temperature food heating device according to first and second embodiments of the disclosure

Embodiments of the disclosure are described below with reference to the drawings. In the high temperature food heating device of the embodiment, the food, which is the object to be heated, is noodles such as udon noodles, soba noodles, and the high temperature food heating device is a high temperature noodle boiling machine which continuously heats a plurality of noodle masses at a high temperature. In the following, the heating tank will be described as a noodle boiling tank 10. FIG. 1 shows a schematic configuration of a high temperature food heating device 1 according to a first embodiment of the disclosure. As shown in the drawing, the high temperature food heating device 1 includes a noodle boiling tank 10 which is a heating tank formed by, for example, a stainless steel plate or the like, a steam supply pipe 16 serving as a heating section, a container conveying section 20, a front side communication chamber 31, a rear side communication chamber 32, a piping 40, and a high pressure fluid source 41.

The noodle boiling tank 10 is divided into three tanks, which are a front reserve tank 13, a main tank 14, and a rear reserve tank 15, by a first partition plate 11 and a second partition plate 12 standing from the bottom of the tank. The main tank 14 stores water at a temperature higher than 100° C. The front reserve tank 13 and the rear reserve tank 15 have a height for storing water and generating a required hydraulic head pressure. That is, the tank between the partition plates 11 and 12 is set as the main tank 14, and the tank adjacent to the main tank 14 via the first partition plate 11 is set as the front reserve tank 13, and the tank adjacent to the main tank 14 via the second partition plate 12 is set as the rear reserve tank 15. The upper part of the main tank 14 is shut off by a lid 30. Water W for boiling noodles is stored inside the tanks 13, 14 and 15. Here, "water" includes hot water, as described above. Moreover, while a vertical wall part 51 of the front reserve tank 13 and a vertical wall part 52 of the rear reserve tank 15 are respectively provided on the sides more distant from the main tank 14 than the first partition plate 11 and the second partition plate 12, the vertical wall parts 51 and 52 may also be provided at positions respectively aligned to the first partition plate 11 and the second partition plate 12.

The steam supply pipe 16 is in the main tank 14 and is provided in the vicinity of the bottom surface. The steam supply pipe 16 is connected to a steam generator (not shown), supplies steam to the water W stored in the main tank 14, and heats the water W and raises the temperature of the water W. As shown in this embodiment, the high temperature food heating device 1 may have, for example, a front reserve tank steam supply pipe 16a serving as a front reserve tank heating section heating water in the front reserve tank 13 and a rear reserve tank cooling water supply pipe 16b as a rear reserve tank cooling section cooling water in the rear reserve tank 15. The front reserve tank steam supply pipe 16a performs heating control so as to maintain the water W in the front reserve tank 13 at a temperature of, for example, about 90° C. to 98° C., and pre-heats the food, specifically the noodles in the embodiment, that continuously passes through the front reserve tank 13. Further, the rear reserve tank cooling water supply pipe 16b performs cooling control so as to maintain the water W in the rear reserve tank at a predetermined temperature of, for example, about 10° C. to 40° C.

The container conveying section 20 continuously brings in a plurality of noodle masses sorted in a predetermined amount in order from the front reserve tank 13 and conveys the noodle masses to the main tank 14, and brings the noodle masses out of the noodle boiling tank 10 from the main tank 14 through rear reserve tank 15. For example, the container conveying section 20 includes an endless chain 28 wrapped around sprockets 21, 22, 23, 24, 25, and 26 respectively provided in the front reserve tank 13, in the front side communication chamber 31, at a position close to the front reserve tank 13 in the main tank 14, at a position close to the rear reserve tank 15 in the main tank 14, in the rear side communication chamber 32 and in the rear reserve tank 15 and a plurality of containers 27 held at an equal pitch on the chain 28. The container 27 is, for example, a cage-shaped, water-permeable container having a bottom and accommodates boiled noodles. Further, the chain 28 is set as an endless chain and is wrapped around a driving sprocket or the like even at a portion not shown in the drawing. In this way, the chain 28 conveys the respective containers 27 in circulation so as to follow the path of the front reserve tank 13→the front side communication chamber 31→the main tank 14→the rear side communication chamber 32→the rear reserve tank 15→the front reserve tank 13→ . . . . If the object to be heated is foods are, for example, retort foods, canned foods, bottled foods, other than noodles, a container in the form which fits the contour of the food and can be directly or indirectly heated with the high temperature water in the main tank 14 can be provided as appropriate.

The front side communication chamber 31 serving as a communication chamber in the present embodiment is, for example, bucket-shaped and has an opened lower side. That is, the front side communication chamber 31 has an upper bottom part 31a facing at least a portion of a bottom surface 14a of the main tank 14 and a bottom surface 13a of the front reserve tank 13 from the top and a frame-shaped sidewall part 31b extending downward from the upper bottom part 31a, and is opened at the bottom. With a portion entering the front reserve tank 13, the front side communication chamber 31 having such a configuration renders an intermediate water surface 13Wm lower than a water surface 13W of the water of the front reserve tank 13, and defines an enclosed space 33 extending above the intermediate water surface 13Wm and a water surface 14W of the main tank 14. The sidewall part 31b has a standing wall-shaped portion which shuts off the two vertical wall-shaped portions shown in the drawing with the end parts on the near side of the drawing and the end parts on the inner side of the drawing, so as to form the frame shape as described above. The sidewall part 31b and the upper bottom part 31a having such a configuration cover from the top, and the above of the intermediate water surface 13Wm and the above of the water surface 14W of the main tank 14 communicate with each other.

Similarly to the front side communication chamber 31, the rear side communication chamber 32 is, for example, bucket-shaped and has an opened lower side. That is, the rear side communication chamber 32 has an upper bottom part 32a facing at least a portion of the bottom surface 14a of the main tank 14 and a bottom surface 15a of the rear reserve tank 15 from the top and a frame-shaped sidewall part 32b extending downward from the upper bottom part 32a, and is opened at the bottom. With a portion entering the rear reserve tank 15, the rear side communication chamber 32 having such a configuration renders an intermediate water surface 15Wm lower than a water surface 15W of the water of the rear reserve tank 15, and defines an enclosed space 34 extending above the intermediate water surface 15Wm and the water surface 14W of the main tank 14. The sidewall part 32b has a standing wall-shaped portion which shuts off the two vertical wall-shaped portions shown in the drawing with the end parts on the near side of the drawing and the end parts on the inner side of the drawing, so as to form the frame shape as described above. The side wall part 32b and the upper bottom part 32a having such a configuration cover from the top, and the above of the intermediate water surface 15Wm and the above of the water surface 14W of the main tank 14 communicate with each other.

The piping 40 and the high pressure fluid source 41 constitute a high pressure fluid supply section in the disclosure. While the high pressure gas in the disclosure refers to a gas with a pressure exceeding the atmospheric pressure, that is, a gas with a pressure exceeding 1 atm, the gas is, in reality, set within a pressure range to be described later. Air is normally used as the gas. Specifically, in the high pressure fluid supply section of this embodiment, the high pressure fluid source 41 is an air pump or an air compressor, and generates high pressure air of, for example, about 2 to 3 atm. This high pressure air is supplied to the inside of the front side communication chamber 31 and the inside of the rear side communication chamber 32 through the piping 40 branched halfway. Therefore, since the air pressures in the interior of the front side communication chamber 31 and the interior of the rear side communication chamber 32 are maintained at a pressure sufficiently higher than the atmospheric pressure, the atmospheric pressures in the front side communication chamber 31 and the rear side communication chamber 32 maintain the volumes of the heat insulating layers of the air in the communication chambers against the external pressure applied to the air in the communication chambers including the hydraulic head pressures, and suppress the deterioration of the heat insulating effect.

Next, the operation and the effect of the high temperature food heating device 1 of the embodiment will be described. In the following description, for the simplicity of description, it is assumed that the front side communication chamber 31 and the rear side communication chamber 32 are provided at positions of the same height and set as gas chambers of the same shape. Then, the operations and the effects of the front reserve tank 13, the front side communication chamber 31 and the main tank 14 is described, and it should be noted that the same can be applied between the rear reserve tank 15, the rear side communication chamber 32 and the main tank 14.

At the time of boiling noodles, the water W for boiling noodles is stored inside the front reserve tank 13, the main tank 14 and the rear reserve tank 15. In addition, a high temperature steam is supplied into the steam supply pipe 16 and the front reserve tank steam supply pipe 16a and indirectly heats its surroundings from the vicinity of the bottom surfaces of the main tank 14 and the front reserve tank 13 through a pipe wall. The flow rate of the high temperature steam supplied into the front reserve tank steam supply pipe 16a and the flow rate of the steam supplied into the steam supply pipe 16 may be the same, or the flow rates may be controlled to be different. With the steam, the water W in the main tank 14 is heated, and the water W in the front reserve tank 13 is preheated. Also, the high pressure fluid source 41 is operated, and the high pressure air of, for example, about 2 to 3 atm is supplied into the front side communication chamber 31 and the rear side communication chamber 32, respectively. Cooling water at a predetermined temperature is supplied in circulation to the rear reserve tank cooling water supply pipe 16b, and then cools off the water in the rear reserve tank 15 to a predetermined temperature in the vicinity of the bottom of the rear reserve tank 15. At this time, the temperature of each of the tanks is maintained at a predetermined temperature by comprehensively detecting the water temperature in each of the tanks with a plurality of temperature sensors (not shown) and controlling the amount of the steam or the cooling water that is supplied.

In addition, as the container conveying section 20 operates as described above, the containers 27 accommodating the noodles sequentially pass through the front reserve tank 13, the main tank 14 and the rear reserve tank 15. Here, the noodles accommodated in the containers 27 are preheated in the front reserve tank 13 with water at a normal pressure and at a predetermined temperature. Next, in the main tank 14, the noodles accommodated in the containers 27 are boiled up with water at a high pressure and at a predetermined temperature higher than 100° C. Finally, in the rear reserve tank 15, the noodles accommodated in the containers 27 are cooled with water at a normal pressure and a predetermined temperature to remove the crude heat. The noodles having undergone the above process are taken out of the containers 27 that exit the rear reserve tank 15.

Here, the intermediate water surface 13Wm of the front reserve tank 13 is subjected to a pressure obtained by adding the atmospheric pressure to the hydraulic head pressure generated by the hydraulic head between the intermediate water surface 13Wm and the water surface 13W in the front reserve tank 13. This pressure also acts on the water surface 14W of the main tank 14 through the air in the front side communication chamber 31. This point is the same between the rear reserve tank 15 and the main tank 14. In this way, since a pressure exceeding 1 atm by the hydraulic head pressure is applied to the water W in the main tank 14, the boiling point of the water W rises and exceeds 100° C. Specifically, it is maintained at a constant temperature, such as a high temperature of 110° C., in the range from 105° C. to 120° C. By sterilizing the noodles while boiling the noodles with the water W in the main tank 14 at a high temperature, the boiling time is shortened and the texture of the boiled noodles is also favorable. Also, while being boiled, the noodles can be exposed to a high temperature exceeding 100° C., which kills bacteria more reliably, for a predetermined period of time, so the sterilization treatment can be efficiently and reliably performed, and the safety of foods can be enhanced.

Since the air in the front side communication chamber 31 acts as a heat insulating layer for insulation between the intermediate water surface 13Wm and the water surface 14W of the main tank 14, it is possible to prevent the temperature of the water in the front reserve tank 13 from rising to an undesirable extent due to the heat from the main tank 14. This point is the same between the rear reserve tank 15, the rear side communication chamber 32 and the main tank 14.

Here, the portion where the intermediate water surface 13Wm of the front reserve tank 13 is rendered (the portion closer to the side of the main tank 14 than the broken line in the drawing) is a second storage part 132 in the front reserve tank 13 in the disclosure, and the portion on the opposite side to the main tank 14 with respect to the second storage part 132 is a first storage part 131 in the front reserve tank 13 in the disclosure. In the position indicated by the broken line, a partition member which extends downward from the above of the intermediate water surface 13Wm and of which a lower end is separated upward from the bottom surface 13a may be provided to clearly partition between the first storage part 131 and the second storage part 132 in the front reserve tank 13. This also applies to a first storage part 151 and a second storage part 152 in the rear reserve tank 15. It is also the same in FIG. 2 that the broken line indicates the boundary between the first storage part 131 and the second storage part 132 in the front reserve tank 13 and the boundary between the first storage part 151 and the second storage part 152 in the rear reserve tank 15.

Since the high pressure air is supplied into the front side communication chamber 31 and the rear side communication chamber 32 as described above, it is possible to prevent the heat insulating effect from being impaired due to the air acting as heat insulating layers inside the front side communication chamber 31 and the rear side communication chamber 32 is compressed thinly by the hydraulic head pressure. Since this effect is obtained not by making the front side communication chamber 31 and the rear side communication chamber 32 larger but by supplying high pressure air, it is possible to prevent the size of the noodle boiling machine from increasing. Further, the above "high pressure" refers to a predetermined pressure higher than the atmospheric pressure for forming a heat insulating layer that renders necessary and sufficient heat insulating properties, but the "high pressure" is ideally set at a value obtained by adding the hydraulic head pressure to the atmospheric pressure or higher than the value. As a result, on the conveyance path, heat is insulated and the hydraulic head pressure gently increases between the front reserve tank 13 and the main tank 14, and heat is insulated between the rear reserve tank 15 and the main tank 14 and the hydraulic head pressure gently decreases, so even if the temperature of the main tank is high, the noodles do not rupture due to sudden depressurization, and it is possible to continuously proceed from preheating to cooling after heating at desired temperatures, and heating becomes more efficient.

Next, a second embodiment of the disclosure will be described. The high temperature food heating device of the second embodiment of the disclosure is basically the same as the high temperature food heating device 1 shown in FIG. 1. Compared with the high temperature food heating device 1 of the first embodiment, the high temperature food heating device of the second embodiment is basically different in that a cooking oil, such as vegetable oil, which is a liquid, replaces air, which is a gas, to serve as the heat insulating bodies respectively stored in the front side communication chamber 31 and the rear side communication chamber 32 for insulating heat. Specifically, an oil feeding pump is provided to replace the air pump of the high pressure fluid source 41 in FIG. 1. Also, regarding the piping 40, an oil pipe is provided in replacement of an air piping. The pressurized liquid in the disclosure refers to a pressurized liquid for delivering the liquid to the communication chambers, and is a liquid that does not mix directly with water in the communication chambers, has heat insulating properties, and is harmless in terms of food sanitation and does not ignite at 120° C.

Also, in the high temperature food heating device of the second embodiment, basically, the same effect of the high temperature food heating device 1 of the first embodiment can be obtained. In particular, since oil has a higher density, a lower compression ratio, and a higher pressure resistance than air, it is possible to resist the external pressure to maintain the volume of the vegetable oil in each of the front side communication chamber 31 and the rear side communication chamber 32 and hold the heat insulating layer even if the pressure of the vegetable oil is lower. Therefore, for example, even when the hydraulic head pressure is increased to further raise the temperature of the main tank 14, it is possible to suppress deterioration of the heat insulating effect. In addition, since the pressures in the interior of the front side communication chamber 31 and the rear side communication chamber 32 are smaller than the pressure in the interior of the main tank 14, the noodle boiling tank 10 serving as a heating tank is easier to handle than a high-pressure pressure container. Moreover, while water can be used as the pressurized liquid, the water used as the pressurized liquid will may mix with the water in the main tank 14 and the communication tanks even if the pressurized liquid is supplied into the communication chambers like the high pressure gas, so it is not possible to obtain the heat insulating effect. Therefore, for example, water curtains may be formed in the communication chambers by forming a water flow with pressurized water. At this time, the supplied water is pressurized to render a pressure exceeding 1 atm, so the supplied water is covered by the "pressurized liquid".

Figure 2:
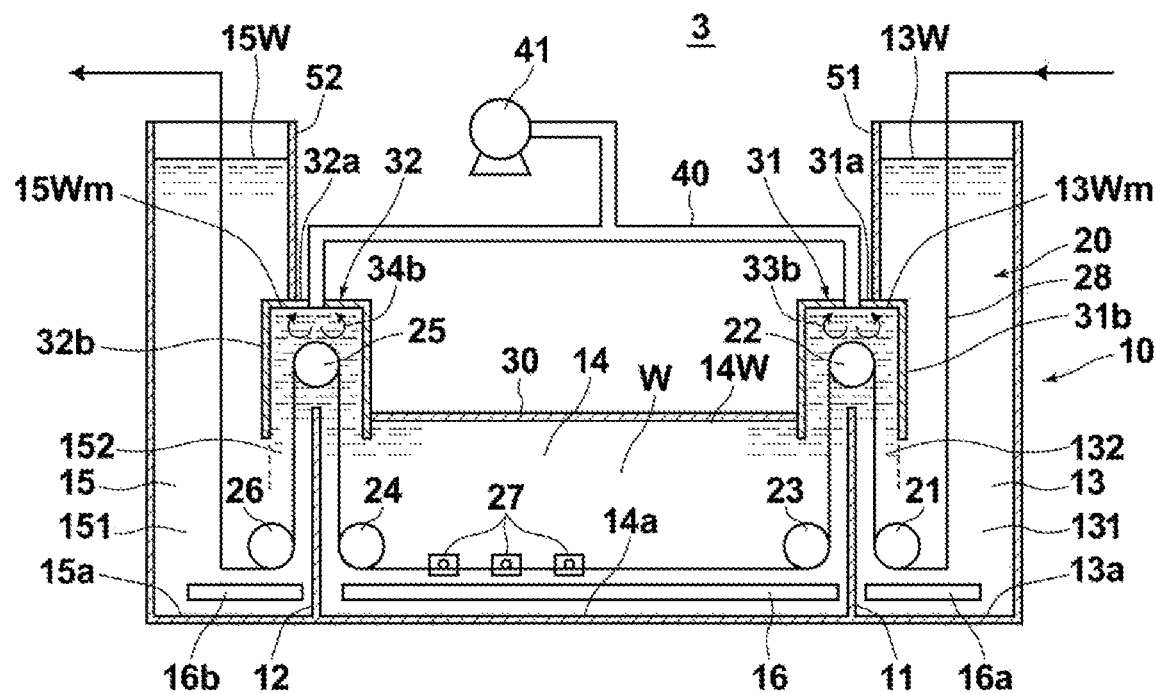
FIG. 2 is a schematic side view illustrating a high temperature food heating device according to a third embodiment of the disclosure

Referring now to FIG. 2, a third embodiment of the disclosure will be described. FIG. 2 shows a schematic configuration of a high temperature food heating device 3 according to a third embodiment of the disclosure. Compared with the high temperature food heating device 1 of the first embodiment, the high temperature food heating device 3 is basically different in that the high temperature food heating device 3 insulates between the front reserve tank 13 and the main tank 14 and between the main tank 14 and the rear reserve tank 15 with the water curtains formed by the pressurized water flow. The front side communication chamber 31 is provided so that the two portions protruding downward enter the water from the intermediate water surface 13Wm of the front reserve tank 13 and the water surface 14W of the main tank 14, respectively. The rear side communication chamber 32 is provided so that the two portions protruding downward enter the water from the intermediate water surface 15Wm of the rear reserve tank 15 and the water surface 14W of the main tank 14, respectively. A pressurized water pump is used as the high pressure fluid source 41, and the piping 40 is set as a water supply piping.

Also, in the high temperature food heating device 3 of the third embodiment, basically, the same effect of the high temperature food heating device 1 of the first embodiment can be obtained. That is, in the front side communication chamber 31 and the rear side communication chamber 32, the curtains of the water flow indicated by arrows 33b and 34b in FIG. 2 are generated, and heat is insulated between the front reserve tank 13 and the main tank 14 and between the main tank 14 and the rear reserve tank 15. In the high temperature heating device 3 of the third embodiment, since the internal pressures in the communication chambers are low pressures, the pressure in the main tank 14 is released toward the communication chambers, and the high temperature heating device 3 is easy to handle.

In the high temperature heating device 3 of the third embodiment, even though the heat insulating property is slightly lower than that of air when the heat insulating layer is formed in the communication chamber by the pressurized liquid, the communication chambers are filled with pressurized liquid without the layers of air, the front reserve tank, the main tank, and the reserve tank apparently are jointed together, and the respective tanks of the three tanks are arranged side by side in a lateral direction and connected with one communication chamber, which is similar to the so-called "open-type deforming pot". Therefore, the high temperature heating device 3 of the third embodiment is easy to handle. For example, one communication chamber is composed of an upper bottom part and a frame-shaped sidewall part, the upper bottom part faces from the top at least a portion of the bottom surface 13a of the front reserve tank 13, the bottom surface 14a of the main tank 14 and the bottom surface 15a of the rear reserve tank 15, and the frame-shaped sidewall part extends downward from the upper bottom part. If one communication chamber is provided, the container conveying section 20, for example, is configured to continuously convey the containers 27 accommodating boiled noodles, for example, in the order of the water of the front reserve tank 13, the inside of the communication chamber, the water of the main tank 14, the inside of the communication chamber, and the water of the rear reserve tank 15.

The embodiments were chosen in order to explain the principles of the disclosure and its practical application. Many modifications and variations are possible in light of the above teachings. It is intended that the scope of the disclosure is defined by the claims.

What is claimed is:

1. A high temperature food heating device, comprising:
   a heating tank comprising three tanks, which are a main tank for storing water at a temperature higher than 100° C. and a front reserve tank and a rear reserve tank respectively storing water, wherein each of the front reserve tank and the rear reserve tank has a first storage part having an opening at an upper part and a second storage part communicating with the first storage part at a lower part of the first storage part and having an opening at an upper part;
   a front reserve tank heating section for heating the water in the front reserve tank to a predetermined temperature from 90° C. to 98° C. from a vicinity of the bottom surface of the front reserve tank;
   a main tank heating section for heating the water in the main tank to a predetermined temperature from 105° C. to 120° C. from a vicinity of the bottom surface of the main tank;
   a rear reserve tank cooling section for cooling the water in the rear reserve tank to a predetermined temperature of 10° C. to 40° C. from a vicinity of the bottom surface of the rear reserve tank;
   a communication chamber for storing a pressurized gas or a pressurized liquid which acts as a heat insulating layer inside the communication chamber and communicating between a water surface of each of the second storage parts of the front reserve tank and the rear reserve tank and a water surface of the main tank through the heat insulating layer;
   a pressurized fluid supply section for supplying the pressurized gas or the pressurized liquid which acts as the heat insulating layer into the communication chamber directly to maintain a volume of the heat insulating layer, wherein the pressurized fluid supply section is connected to the communication chamber;
   a front side communication chamber communicating between the water surface of the second storage part of the front reserve tank and the water surface of the main tank and a rear side communication chamber communicating between the water surface of the second storage part of the rear reserve tank and the water surface of the main tank to serve as the communication chamber; and
   a container conveying section for conveying a container accommodating noodles as an object to be heated to pass through, in order, the water of the front reserve tank, inside of the front side communication chamber, the water of the main tank, inside of the rear side communication chamber, and the water of the rear reserve tank, wherein the container conveying section keeps the container in the water of the main tank between the front side communication chamber and the rear side communication chamber;
   the three tanks being provided side by side in a lateral direction,
   the front side communication chamber comprising an upper part facing downward toward at least a portion of each bottom surface of the main tank and the front reserve tank, and a frame-shaped sidewall part extending downward from the upper part, and
   the rear side communication chamber comprising an upper part facing downward toward at least a portion of each bottom surface of the main tank and the rear reserve tank, and a frame-shaped sidewall part extending downward from the upper part.

2. The high temperature food heating device according to claim 1, wherein the heating tank is divided into the three tanks by a first partition plate and a second partition plate standing from a bottom surface of the heating tank,
   wherein a portion of the front side communication chamber, a portion of the rear side communication chamber, and a lid covers an upper part of the main tank and the main tank is provided between the first partition plate and the second partition plate,
   wherein the front reserve tank is formed at a height for generating a predetermined hydraulic head pressure and is provided adjacent to the main tank via the first partition plate,
   wherein the rear reserve tank is formed at a height for generating the same predetermined hydraulic head pressure of the front reserve tank and is provided adjacent to the main tank via the second partition plate,
   wherein a pressure of the pressurized gas or the pressurized liquid is at a value obtained by adding the predetermined hydraulic head pressure to an atmospheric pressure or higher than the value, and
   wherein when the inside of the main tank is filled up with the water, the lid is in contact with all parts of the water surface of the main tank except the portion facing the front side communication chamber and the rear side communication chamber.

3. The high temperature food heating device according to claim 1, wherein the pressurized gas or the pressurized liquid has a pressure of 2 atm to 3 atm.

4. The high temperature food heating device according to claim 1, wherein the pressurized gas is air and the pressurized liquid is a cooking oil or water.

5. The high temperature food heating device according to claim 1, wherein
- the front reserve tank heating section comprises a front reserve tank steam supply pipe provided in the vicinity of the bottom surface of the front reserve tank and transmitting heat of steam passing through the pipe to the water in the front reserve tank through a pipe wall,
- the main tank heating section comprises a steam supply pipe provided in the vicinity of the bottom surface of the main tank and transmitting heat of steam passing through the pipe to the water in the main tank through a pipe wall,
- the rear reserve tank cooling section comprises a rear reserve tank cooling water supply pipe provided in the vicinity of the bottom surface of the rear reserve tank and supplying cooling water in circulation to the pipe.

* * * * *